(12) United States Patent
Cohen et al.

(10) Patent No.: US 7,663,639 B2
(45) Date of Patent: Feb. 16, 2010

(54) METHODS AND SYSTEMS FOR PROVIDING TEXTURE TILING AND MIRRORING

(75) Inventors: Miles M. Cohen, Seattle, WA (US); Christopher N. Raubacher, Seattle, WA (US); Jason H. Hartman, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 11/182,346

(22) Filed: Jul. 15, 2005

(65) Prior Publication Data
US 2007/0013712 A1    Jan. 18, 2007

(51) Int. Cl.
*G09G 5/00* (2006.01)
(52) U.S. Cl. .................................... 345/584
(58) Field of Classification Search ................. 345/584
See application file for complete search history.

(56) References Cited

U.S. PATENT DOCUMENTS

| 7,136,071 | B1 * | 11/2006 | Donovan et al. | 345/582 |
| 2002/0180741 | A1 * | 12/2002 | Fowler et al. | 345/520 |
| 2003/0206176 | A1 * | 11/2003 | Ritter | 345/582 |

* cited by examiner

*Primary Examiner*—Aaron M Richer
(74) *Attorney, Agent, or Firm*—Merchant & Gould

(57) ABSTRACT

Systems and methods are disclosed for providing texture tiling. The disclosed systems and methods may include copying a source image into a texture of a size the same or larger than the source image. Furthermore, the disclosed systems and methods may include displacing texture coordinates corresponding to the texture into a desired range. A displacement map may be used in displacing the texture coordinates. Moreover, the disclosed systems and methods may include rendering, within the desired range, an output image corresponding to the texture coordinates associated with the texture.

12 Claims, 4 Drawing Sheets

METHODS AND SYSTEMS FOR PROVIDING TEXTURE TILING AND MIRRORING

BACKGROUND OF THE INVENTION

I. Field of the Invention

The present invention generally relates to methods and systems for providing texture tiling and mirroring. More particularly, the present invention relates to providing non-power-of-two texture tiling and mirroring using a displacement map.

II. Background Information

Tiling and mirroring are processes for displaying objects side by side on a computer display. For example, a "tile" command in a graphical interface may repeat a particular object, element, or image in a certain row and column order. In some situations, graphics cards within conventional computing devices support tiling or mirroring of textures that have power-of-two dimensions. Few of them, however, support texture tiling or mirroring with non-power-of-two dimensions. While, developers have traditionally chosen power-of-two textures because they have traditionally been the only type supported, this often causes problems because power-of-two textures are very limiting.

Other conventional tiling processes include retessellating an area being drawn. This often causes problems because retessellating is both complicated and central processing unit (CPU) intensive. While some developers may be content to use power-of-two textures, other hardware accelerated platforms may benefit from tiling non-power-of-two textures.

In view of the foregoing, there is a need for improved methods and systems for texture tiling and mirroring. Furthermore, there is a need for providing non-power-of-two texture tiling and mirroring using, for example, a displacement map.

SUMMARY OF THE INVENTION

Consistent with embodiments of the present invention, systems and methods are disclosed for providing texture tiling and mirroring.

In accordance with one embodiment, a method for providing texture tiling comprises copying a source image into a texture of a size the same or larger than the source image, displacing texture coordinates corresponding to the texture into a desired range, and rendering an output image corresponding to the texture coordinates associated with the texture.

According to another embodiment, a system for providing texture tiling comprises a memory storage for maintaining a database and a processing unit coupled to the memory storage, wherein the processing unit is operative to copy a source image into a texture of a size the same or larger than the source image, displace texture coordinates corresponding to the texture into a desired range, and render an output image corresponding to the texture coordinates associated with the texture.

In accordance with yet another embodiment, a computer-readable medium which stores a set of instructions which when executed performs a method for providing texture tiling, the method executed by the set of instructions comprising copying a source image into a texture of a size the same or larger than the source image; displacing texture coordinates corresponding to the texture into a desired range; and rendering, within the desired range, an output image corresponding to the texture coordinates associated with the texture.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
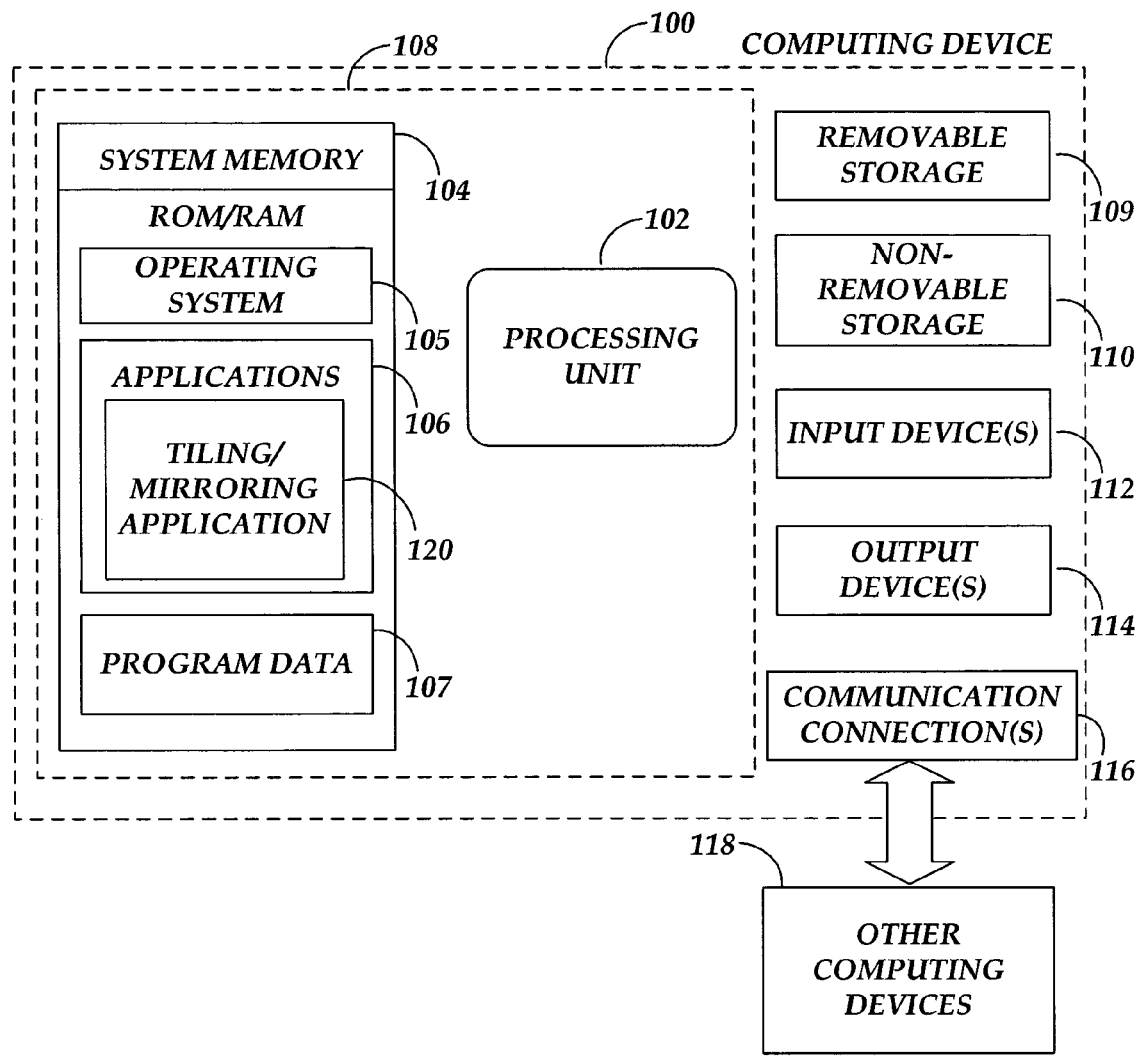
FIG. 1 is a block diagram of an exemplary computing device consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding stages to the disclosed methods. Accordingly, the following detailed description does not limit the invention. Instead, the proper scope of the invention is defined by the appended claims.

Systems and methods consistent with embodiments of the present invention provide texture tiling and mirroring. For example, embodiments of the invention may tile any sized texture by applying a displacement map in a first stage of a two stage fixed function graphics pipeline. The displacement map may displace texture coordinates back into an acceptable range. In addition, a texture layout may be used that may mirror the texture as well as tile it.

Consistent with embodiments of the present invention, images of any dimension may be wrapped or mirrored without requiring, for example, retessellation. Many conventional graphics cards support wrapping and mirroring of power-of-two textures using one texture stage. Embodiments of the present invention may bypass the aforementioned graphics cards' limitation by: i) copying an image into a texture of the same or larger size; and then ii) using a second texture stage to displace texture coordinates back into a range within the same or larger texture where the copy of the image exists. Because embodiments of the present invention may handle wrapping the texture coordinates, embodiments of the present invention, for example, may then be free to use the clamp wrapping mode and non-power-of-two texture sizes.

An embodiment consistent with the invention may comprise a system for providing texture tiling and mirroring. The system may comprise a memory storage for maintaining a database and a processing unit coupled to the memory storage. The processing unit may be operative to copy a source image into a texture of the same or a size larger than the source image. In addition, the processing unit may be operative to displace texture coordinates corresponding to the texture into a desired range. Also, the processing unit may be operative to render, within the desired range, an output image corresponding to the texture coordinates associated with the texture.

Consistent with an embodiment of the present invention, the aforementioned memory, processing unit, and other components may be implemented in a computing device, such as an exemplary computing device 100 of FIG. 1. Any suitable combination of hardware, software, and/or firmware may be used to implement the memory, processing unit, or other components. By way of example, the memory, processing unit, or other components may be implemented with any of computing device 100 or any of other computing devices 118, in combination with computing device 100. The aforementioned system, device, and processors are exemplary and other systems, devices, and processors may comprise the aforementioned memory, processing unit, or other components, consistent with embodiments of the present invention.

Generally, program modules may include routines, programs, components, data structures, and other types of structures that perform particular tasks or implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system consistent with an embodiment of the invention may include a computing device, such as computing device 100. In a basic configuration, computing device 100 may include at least one processing unit 102 and a system memory 104. Depending on the configuration and type of computing device, system memory 104 may be volatile (such as RAM), non-volatile (such as ROM, flash memory, etc.) or some combination. System memory 104 may include an operating system 105, one or more applications 106, and may include a program data 107. In one embodiment, application 106 may include a tiling/mirroring application 120. However, embodiments of the invention may be practiced in conjunction with a graphics library, an operating system, or any application program and is not limited to word processing. This basic configuration is illustrated in FIG. 1 by those components within a dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by a removable storage 109 and a non-removable storage 110. Computer storage media may include volatile and nonvolatile, removable and non-removable media implemented in any method or technology for storage of information, such as computer readable instructions, data structures, program modules, or other data. System memory 104, removable storage 109, and non-removable storage 110 are all examples of computer storage media. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. The aforementioned devices are exemplary and others may be used.

Computing device 100 may also contain a communication connection 116 that may allow device 100 to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein may include both storage media and communication media.

A number of program modules and data files may be stored in system memory 104 of computing device 100, including an operating system 105 suitable for controlling the operation of a networked personal computer, such as the WINDOWS operating systems from MICROSOFT CORPORATION of Redmond, Wash. System memory 104 may also store one or more program modules, such as tiling/mirroring application 120, and others described below. While executing on processing unit 102, tiling/mirroring application 120 may perform processes including, for example, one or more of the stages of the methods described below. The aforementioned process is exemplary, and processing unit 102 may perform other processes. Other applications 106 that may be used in accordance with embodiments of the present invention may include electronic mail and contacts applications, word processing applications, spreadsheet applications, database applications, slide presentation applications, drawing or computer-aided application programs, etc.

Figure 2:
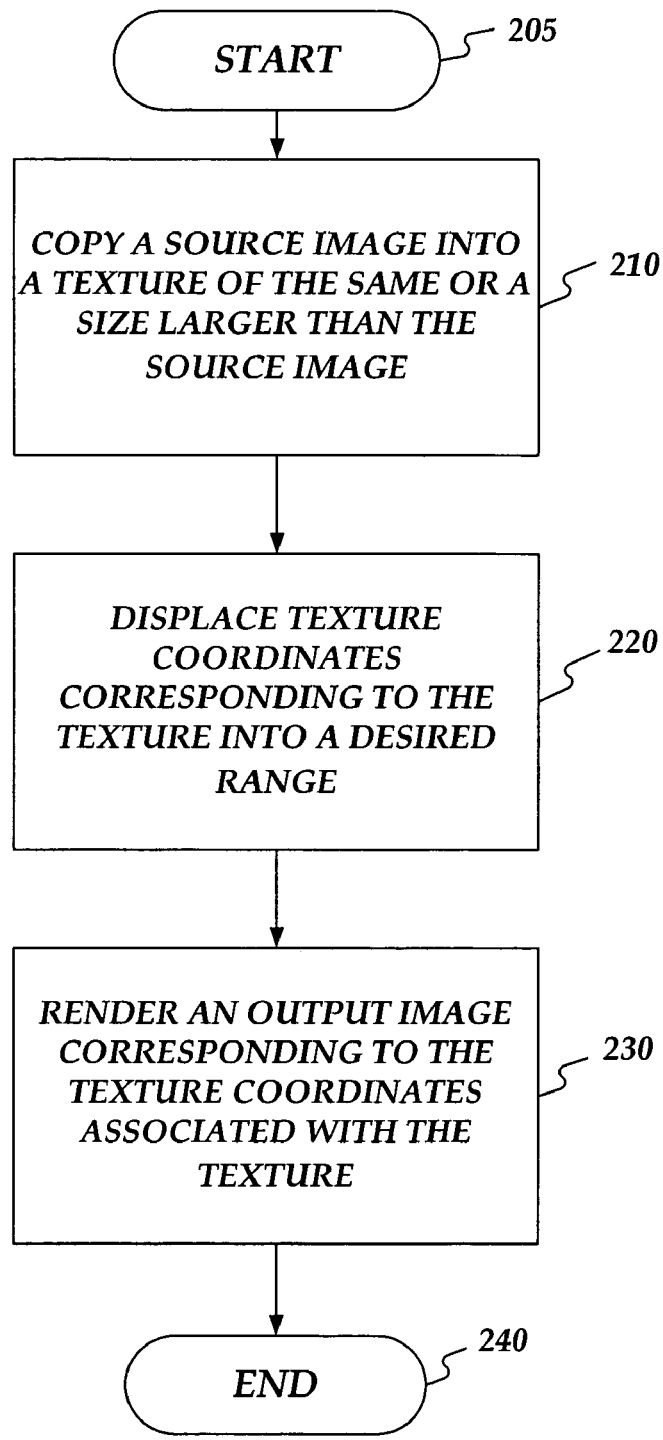
FIG. 2 is a flow chart of an exemplary method for providing texture tiling and mirroring consistent with an embodiment of the present invention.

FIG. 2 is a flow chart setting forth the general stages involved in an exemplary method 200 consistent with the invention for providing texture tiling using computing device 100 of FIG. 1. Exemplary ways to implement the stages of exemplary method 200 will be described in greater detail below. Exemplary method 200 may begin at starting block 205 and proceed to stage 210 where computing device 100 may copy a source image into a texture of a size the same or larger than the source image. For example, as described below with respect to Table 2 and Table 3 below, to support linear filtering for tiling a source image, the texture may be increased, for example, by one pixel width in all four directions. The edges may then be copied onto the opposite sides of the texture that were just newly created. For example, the source image shown in Table 2 may be copied into a texture of a size the same or larger than the source image as shown in Table 3. This is also illustrated by original source image 405 and texture 420 stored for tile fill shown in FIG. 4.

From stage 210, where computing device 100 copies the source image into the texture of the size the same or larger than the source image, exemplary method 200 may advance to stage 220 where computing device 100 may displace texture coordinates corresponding to the texture into a desired range. For example, the texture coordinates of a mesh may wrap back into a desired range before the texture is sampled. The desired range may be from "Min" to "Max." The following formula may be apply to the texture coordinates.

$$u'=\text{Min}+[u-\text{floor}(u)]*(\text{Max}-\text{Min})$$

One possible way to achieve this formula is to use PIXEL SHADER (e.g. version 2.0 or higher) in DIRECTX from MICROSOFT CORPORATION. Furthermore, this formula may be produced using the fixed function pipeline. Letting w=Max−Min, then the formula becomes:

$$u'=\text{Min}+[u-\text{floor}(u)]*w;$$

and can be rewritten as:

$$u'=[\text{Min}+u*w]-\text{floor}(u)*w.$$

The first half of the formula, [Min+u*w], may be achieved by applying a linear transformation of the texture coordinates. The second half, −floor(u)*w, is non-linear however, and may not be solved using a matrix transformation. Instead, a "displacement map" (sometimes called a "bump map") may be used to do the aforementioned scaled floor operation. An exemplary displacement map is shown below in Table 1.

TABLE 1

| (...,...) | (3,...) | (2,...) | (1,...) | (0,...) | (−1,...) | (−2,...) | (−3,...) | (...,...) |
|---|---|---|---|---|---|---|---|---|
| (...,3) | (3,3) | (2,3) | (1,3) | (0,3) | (−1,3) | (−2,3) | (−3,3) | (...,3) |
| (...,2) | (3,2) | (2,2) | (1,2) | (0,2) | (−1,2) | (−2,2) | (−3,2) | (...,2) |
| (...,1) | (3,1) | (2,1) | (1,1) | (0,1) | (−1,1) | (−2,1) | (−3,1) | (...,1) |
| (...,0) | (3,0) | (2,0) | (1,0) | (0,0) | (−1,0) | (−2,0) | (−3,0) | (...,0) |
| (...,−1) | (3,−1) | (2,−1) | (1,−1) | (0,−1) | (−1,−1) | (−2,−1) | (−3,−1) | (...,−1) |
| (...,−2) | (3,−2) | (2,−2) | (1,−2) | (0,−2) | (−1,−2) | (−2,−2) | (−3,−2) | (...,−2) |
| (...,−3) | (3,−3) | (2,−3) | (1,−3) | (0,−3) | (−1,−3) | (−2,−3) | (−3,−3) | (...,−3) |
| (...,...) | (3,...) | (2,...) | (1,...) | (0,...) | (−1,...) | (−2,...) | (−3,...) | (...,...) |

Each of the entries in Table 1 is a component of a shift that may be applied to the U and V coordinates of the next texture stage in the fixed function graphics pipeline. The displacement map (Table 1) may be aligned onto a 2D mesh such that the texels of the displacement map may be equal to the negative floor of the texture coordinates. A 2×2 bump map matrix may be used to multiply by w. Note that w can be different for u and v, and thus can be referred to as $w_u$ and $w_v$. For example, in DIRECTX, this can be accomplished by setting D3DTSS_BUMPENVMAT00 and D3DTSS_BUMPENVMAT11.

Figure 3:
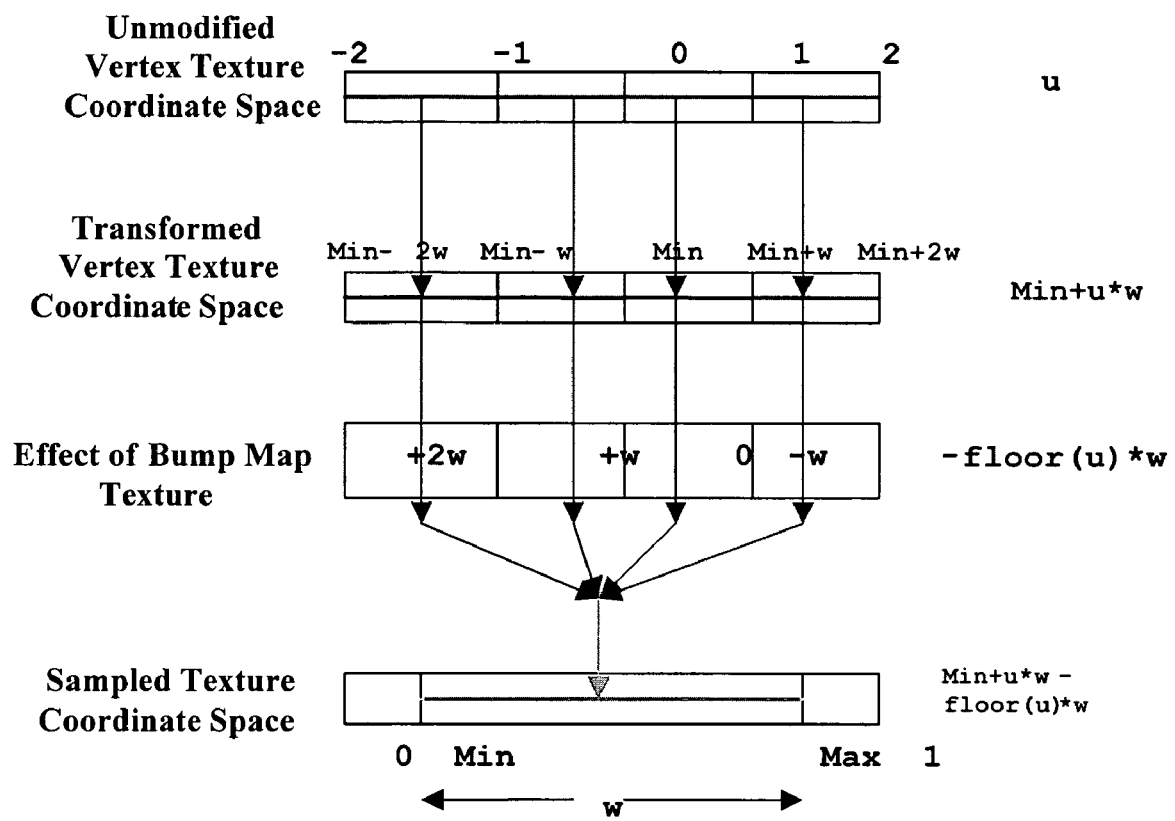
FIG. 3 is a diagram illustrating a transformation from vertex texture coordinate space to sampled texture coordinates space consistent with an embodiment of the present invention.

FIG. 3 is a diagram illustrating a transformation from vertex texture coordinate space to sampled texture coordinates space consistent with an embodiment of the present invention. For example, FIG. 3 visually demonstrates the effect of u'=Min+[u−floor(u)]*(Max−Min). The displacement map, for example, may be aligned such that the (0, 0) texel of the displacement map stretches across the piece of the tessellation that has U and V coordinates in the range of 0 to 1. Furthermore, the displacement map may be aligned such that the (−1, 0) cell acts on the piece of the tessellation that has U coordinates in the range of 1 to 2. Also, the displacement map may be aligned such that the (0, −1) cell acts on the piece of the tessellation that has V coordinates in the range of 1 to 2. Because the texture coordinates may be arranged linearly, the displacement map may work to subtract the floor of the texture coordinates in entire tessellation. For example, a scale may be applied such that a scaled floor may be achieved.

To support linear filtering for tiling an image, the texture may be increased, for example, by one pixel width in all four directions. The edges may then be copied onto the opposite sides of the texture that were just newly created. For example, the source image shown in Table 2 may be copied into a texture of a size the same or larger than the source image as shown in Table 3.

TABLE 2

| A | B | C |
|---|---|---|
| D | E | F |
| G | H | I |

TABLE 3

| I | G | H | I | G |
|---|---|---|---|---|
| C | A | B | C | A |
| F | D | E | F | D |
| I | G | H | I | G |
| C | A | B | C | A |
| Min U | | | | Max U |

The resulting texture (e.g. Table 3) may then be sampled on the inner border of the outer pixels to provide the correct linear interpolation between one side of the original texture and the other at the seams of the tiles. Here the Min and Max values used in the algorithm may be placed on the corner of "IGCA." The resulting Min and Max values may be:

$$\text{Min}U=1/\text{TextureSize}U$$

$$\text{Max}U=1-1/\text{TextureSize}U$$

$$\text{Min}V=1/\text{TextureSize}V$$

$$\text{Max}V=1-1/\text{TextureSize}V$$

To support mirroring, the width and/or height of the texture may be doubled placing a mirrored version in the expanded sections. Then the aforementioned tiling logic may be reused. For example, the above "ABCDEFGHI" (Table 2) image setup for mirroring in both U and V may be as shown in Table 4 below.

TABLE 4

| A | B | C | C | B | A |
|---|---|---|---|---|---|
| D | E | F | F | E | D |
| G | H | I | I | H | G |
| G | H | I | I | H | G |
| D | E | F | F | E | D |
| A | B | C | C | B | A |

This storage format may not require the additional padding of one texel on each side as the tile setup for linear filter does because the additional texels may be the same as the edge texels and clamp wrap mode may give that result automatically, assuming the hardware supports conditional non-power-of-two. Here the Min and Max values used in the algorithm may be placed on the upper left and lower right corners, so their values may be 0 and 1.

To support hardware that can only render power-of-two textures, the texture may be rounded up to the next power-of-two. The mirror expanded portion may be stored in the upper-left portion of the texture and the margin may be filled with the right and lower edges of the mirror expansion.

Figure 4:
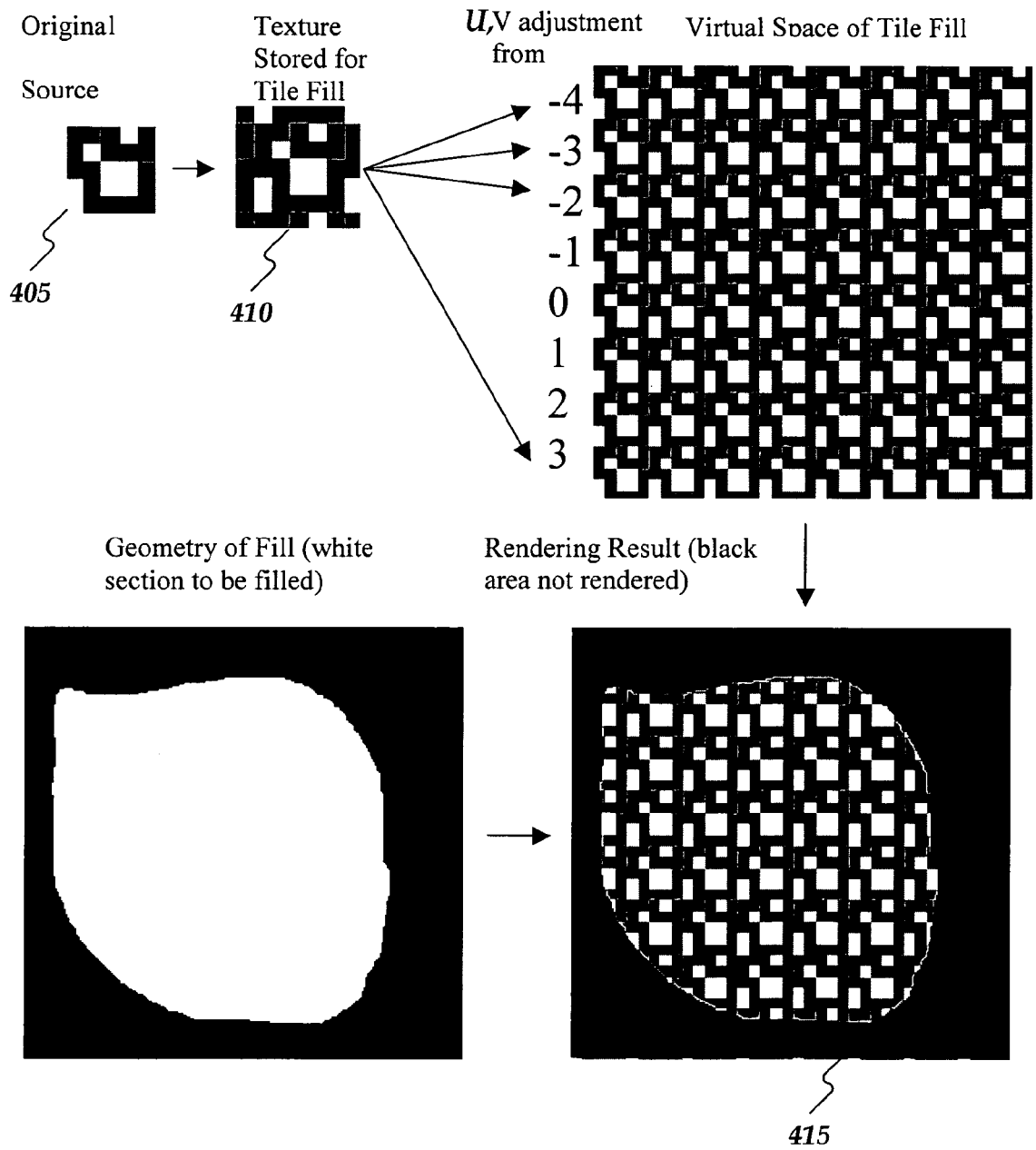
FIG. 4 is a diagram illustrating content progression from source to rendering a result consistent with an embodiment of the present invention.

Once computing device 100 displaces texture coordinates corresponding to the texture into the desired range in stage 220, exemplary method 200 may continue to stage 230 where computing device 100 may render, an output image corresponding to the texture coordinates associated with the texture. For example, FIG. 4 is a diagram illustrating content progression from source to rendering a result consistent with an embodiment of the present invention. Computing device 100 may render output image 415 onto one of output devices 114. After computing device 100 renders the output image in stage 230, exemplary method 200 may then end at stage 240.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The present invention may be embodied as systems, methods, and/or computer program products. Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention may exist. Furthermore, although embodiments of the present invention have been described as being associated with data stored in memory and other storage mediums, aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method for providing texture tiling, the method comprising:

copying a source image into a texture of a size larger than the source image, wherein copying the source image into the texture of the size larger than the source image comprises:

increasing the texture size by at least one pixel in each direction, and copying a first edge of the source image onto the at least one pixel on a second edge of the texture opposite to the first edge of the source image;

displacing texture coordinates corresponding to the texture into a desired range;

displacing the texture coordinates comprising u and v using the following equations:

$u'=[Min+u*w]-\text{floor}(u)*w;$ and $v'=[Min+v*w]-\text{floor}(v)*w;$ wherein w comprises a difference between Max and Min; and wherein Max and Min comprise a range of desired texture coordinates; and calculating, by a computing device, at least one of −floor(u) and −floor(v) using a displacement map; and rendering an output image corresponding to the texture coordinates associated with the texture.

2. The method of claim 1, wherein displacing the texture coordinates further comprises displacing the texture coordinates using a displacement map.

3. The method of claim 2, wherein displacing the texture coordinates further comprises applying the displacement map in a first stage of a two stage fixed function graphics pipeline.

4. The method of claim 1, wherein calculating at least one of [Min+u*w] and [Min+v*w] further comprises using a linear transformation.

5. The method of claim 1, wherein copying the source image further comprises supporting mirroring by:

doubling at least one of the width and the height of the texture; and placing a mirrored version of the source image in an expanded section of the texture.

6. A system for providing texture tiling, the system comprising:

a memory storage for maintaining a database; and a processing unit coupled to the memory storage, wherein the processing unit is operative to:

copy a source image into a texture of a size larger than the source image, wherein the processing unit being operative to copy the source image into the texture of the size larger than the source image comprises the processing unit being operative to:

increase the texture size by at least one pixel in each direction, and copy a first edge of the source image onto the at least one pixel on a second edge of the texture opposite to the first edge of the source image;

displace texture coordinates corresponding to the texture into a desired range;

displace the texture coordinates comprising u and v using the following equations:

$u'=[Min+u*w]-floor(u)*w$; and $v'=[Min+v*w]-floor(v)*w$;

wherein w comprises a difference between Max and Min; and wherein Max and Min comprise a range of desired texture coordinates; and calculate at least one of −floor(u) and −floor(v) using a displacement map; and render an output image corresponding to the texture coordinates associated with the texture.

7. The system of claim 6, wherein the processing unit being operative to displace the texture coordinates further comprises the processing unit being operative to displace the texture coordinates using a displacement map.

8. The system of claim 6, wherein the processing unit is further operative to calculate at least one of [Min+u*w] and [Min+v*w] using a linear transformation.

9. The system of claim 6, wherein the processing unit being operative to copy the source image further comprises the processing unit being operative to supporting mirroring by:

the processing unit being further operative to double at least one of the width and the height of the texture; and the processing unit being further operative to place a mirrored version of the source image in an expanded section of the texture.

10. A computer-readable storage medium which stores a set of instructions which when executed performs a method for providing texture tiling, the method executed by the set of instructions comprising:

copying a source image into a texture of a size larger than the source image, wherein copying the source image into the texture of the size larger than the source image comprises:

increasing the texture size by at least one pixel in each direction, and copying a first edge of the source image onto the at least one pixel on a second edge of the texture opposite to the first edge of the source image;

displacing texture coordinates corresponding to the texture into a desired range, wherein displacing texture coordinates corresponding to the texture into a desired range comprises:

displacing the texture coordinates comprising u and v using the following equations:

$u'=[Min+u*w]-floor(u)*w$, and $v'=[Min+v*w]-floor(v)*w$;

wherein w comprises a difference between Max and Min; and wherein Min and Max comprise a range of desired texture coordinates calculating at least one of −floor(u) and −floor(v) using a displacement map; and rendering an output image corresponding to the texture coordinates associated with the texture.

11. The computer-readable storage medium of claim 10, wherein calculating at least one of −floor(u) and −floor(v) using a displacement map further comprises applying the displacement map in a first stage of a two stage fixed function graphics pipeline.

12. The computer-readable storage medium of claim 10, wherein calculating at least one of [Min+u*w] and [Min+v*w] further comprises using a linear transformation.

* * * * *